United States Patent
Chandrasekaran et al.

(10) Patent No.: US 12,351,300 B2
(45) Date of Patent: Jul. 8, 2025

(54) ANTI-RESONANCE SYSTEM FOR VARIABLE SPEED ROTORS

(71) Applicants: Ruthvik Chandrasekaran, Los Angeles, CA (US); David J. Hodges, Dallas, GA (US); Margaret E. Hodges

(72) Inventors: Ruthvik Chandrasekaran, Los Angeles, CA (US); Dewey H. Hodges, Atlanta, GA (US); David J. Hodges, Dallas, GA (US)

( * ) Notice: Subject to any disclaimer, the term of this patent is extended or adjusted under 35 U.S.C. 154(b) by 0 days.

(21) Appl. No.: 18/767,974

(22) Filed: Jul. 9, 2024

(65) Prior Publication Data

US 2024/0359794 A1 Oct. 31, 2024

Related U.S. Application Data

(63) Continuation-in-part of application No. 18/514,175, filed on Nov. 20, 2023, now abandoned.

(60) Provisional application No. 63/427,180, filed on Nov. 22, 2022.

(51) Int. Cl.
  *B64C 27/00* (2006.01)
  *B64C 27/04* (2006.01)
  *B64C 27/68* (2006.01)

(52) U.S. Cl.
  CPC .......... *B64C 27/001* (2013.01); *B64C 27/68* (2013.01); *B64C 2027/004* (2013.01); *B64C 27/04* (2013.01)

(58) Field of Classification Search
  CPC .......... B64C 27/001; B64C 2027/004; B64C 2027/005; B64C 27/51; F01D 25/06; F01D 5/10; F01D 5/16; F01D 5/26; F05D 2260/96; F04D 29/668; F05B 2260/96; F05B 2260/964; F05B 2270/334; F03D 7/0296; F03D 7/0298; F03D 17/015
  USPC .............. 416/87–89, 144–145, 500
  See application file for complete search history.

(56) References Cited

U.S. PATENT DOCUMENTS 5,735,670 A * 4/1998 Moffitt ................ B64C 27/46
                                                            244/17.11
8,297,928 B2 * 10/2012 Manfredotti ............ F03D 1/06
                                                            416/500

FOREIGN PATENT DOCUMENTS

FR         3045717 A1 *  6/2017

OTHER PUBLICATIONS

English machine translation of FR-3045717-A1, Nov. 2, 2024.*

* cited by examiner

*Primary Examiner* — Christopher Verdier
(74) *Attorney, Agent, or Firm* — Bryan W. Bockhop; Bockhop Intellectual Property Law, LLC

(57) ABSTRACT

An anti-resonance system for a blade defining an elongated channel therein and affixed to a helicopter rotor includes a moveable mass disposed within the elongated channel of the blade so as to be able to slide along elongated channel. A moving device coupled to the moveable mass is configured to move the moveable mass within the elongated channel. A controller is configured to cause the moving device to move the moveable mass to a selected position within the elongated channel so as to avoid the resonance vibrations of the blade during a rotor speed change. In a method of avoiding resonance of a helicopter blade, a current rotational speed of the blade is determined. A position of the moveable mass so as to avoid a resonance point at a current rotational speed is obtained. The moveable mass is moved to the position.

10 Claims, 10 Drawing Sheets

ANTI-RESONANCE SYSTEM FOR VARIABLE SPEED ROTORS

CROSS-REFERENCE TO RELATED APPLICATION(S)

This application is a Continuation-in-Part of U.S. patent application Ser. No. 18/514,175, filed Nov. 20, 2023, which claims the benefit of U.S. Provisional Patent Application Ser. No. 63/427,180, filed Nov. 22, 2022, the entirety of each of which is hereby incorporated herein by reference.

BACKGROUND OF THE INVENTION

1. Field of the Invention

The present invention relates to helicopter rotor blades and, more specifically, to a helicopter rotor blade that includes an anti-resonance system.

2. Description of the Related Art

The efficiency and operating envelope of rotorcraft are constrained by the speed of the rotor. Most helicopters operate at a constant rotor speed. Varying the speed of the rotor based on the operating condition could significantly improve the rotor's performance. However, changing the rotor speed leads to vibration issues when a rotor passes through a resonance point. The forces and moments acting on the blade and the hub increase significantly when a rotor passes through a resonance point.

Therefore, there is a need for a system that allows a rotor to avoid resonance points while varying rotor speed.

SUMMARY OF THE INVENTION

The disadvantages of the prior art are overcome by the present invention which, in one aspect, is an anti-resonance system for a blade defining an elongated channel therein and affixed to a helicopter rotor that includes a moveable mass disposed within the elongated channel of the blade so as to be able to slide along elongated channel. A moving device coupled to the moveable mass is configured to move the moveable mass within the elongated channel. A controller is configured to cause the moving device to move the moveable mass to a selected position within the elongated channel so as to avoid the resonance vibrations of the blade during a rotor speed change.

In another aspect, the invention is a helicopter rotor assembly that includes a main rotor hub and a plurality of blades extending from the main rotor hub, each of which defining an elongated channel therein. A moveable mass is disposed within the elongated channel of each of the plurality of blades so as to be able to slide along elongated channel. A moving device is coupled to each moveable mass and is configured to move the moveable mass within the elongated channel. A controller is configured to cause each moving device to move the moveable mass to a selected position within the elongated channel so as to avoid resonance of each blade during rotor speed change. Changing a position of the moveable mass changes the blade's natural frequency, so that resonance points are actively moved out of rotor operating speed, thereby reducing blade vibrations.

In yet another aspect, the invention is a method of avoiding resonance of a helicopter blade, in which a current rotational speed of the blade is determined. A position of the moveable mass so as to avoid a resonance point at a current rotational speed is obtained. The moveable mass is moved to the position.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
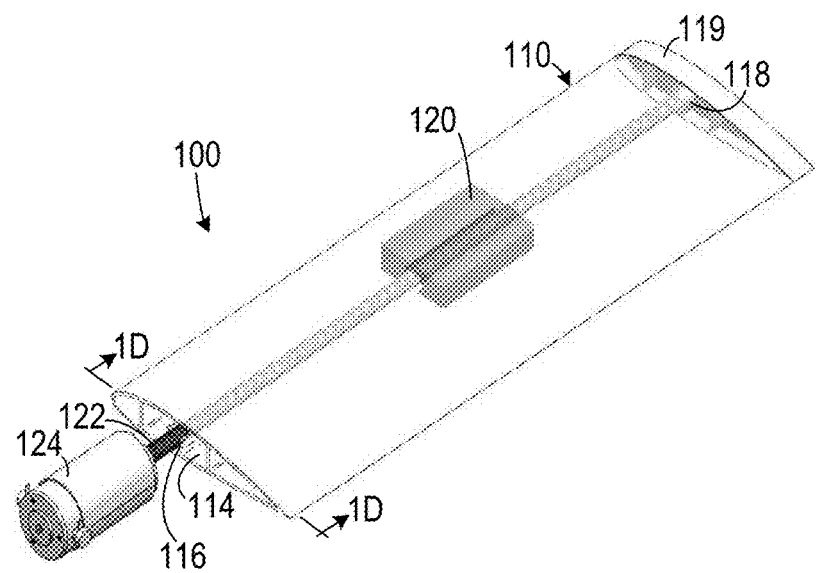
FIG. 1A is a perspective view of a helicopter blade employing an anti-resonance system.
Figure 1B:
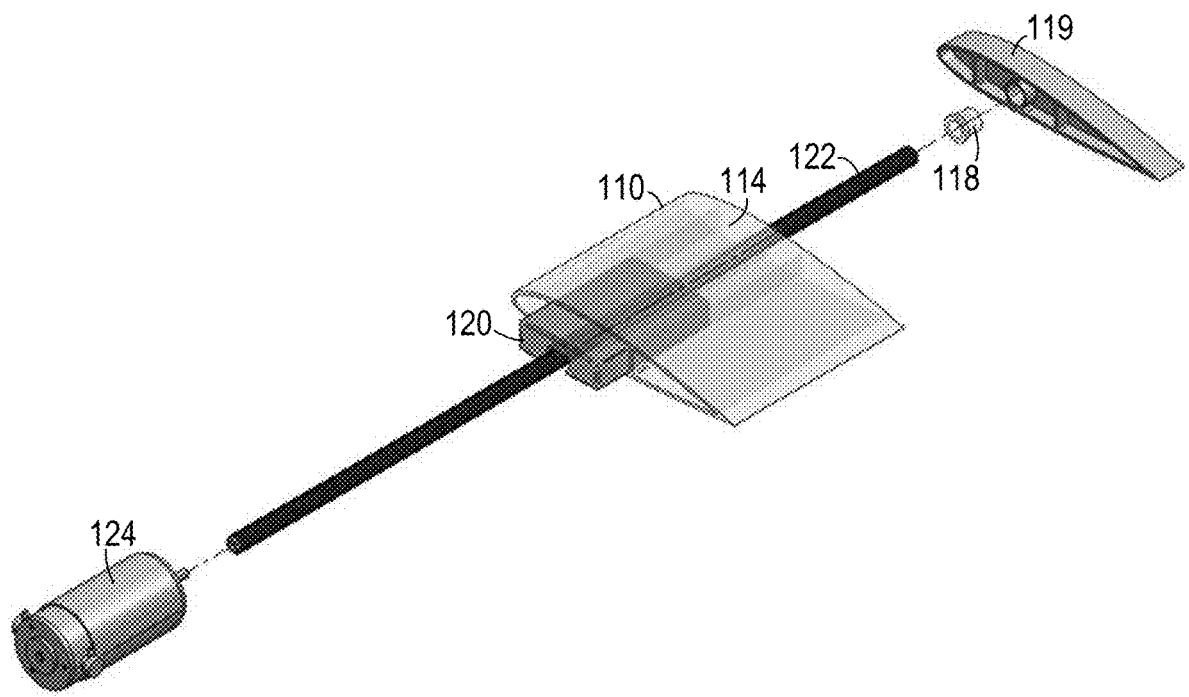
FIG. 1B is an exploded view of the system shown in FIG. 1A.
Figure 1C:
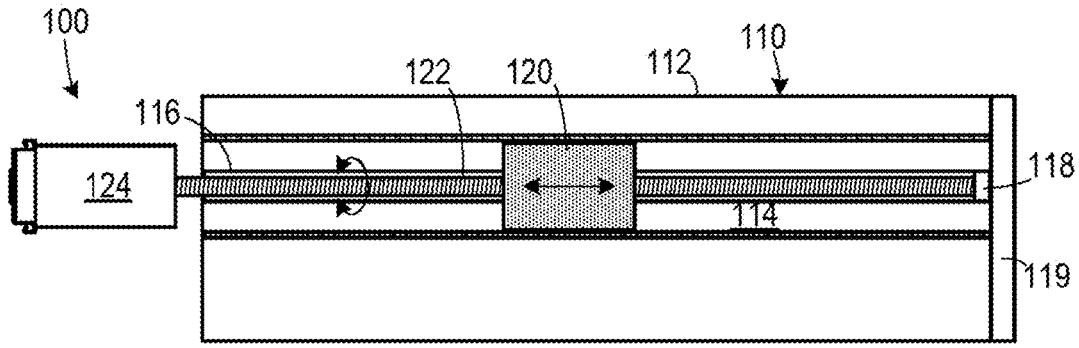
FIG. 1C is a top schematic view of the system shown in FIG. 1A.
Figure 1D:
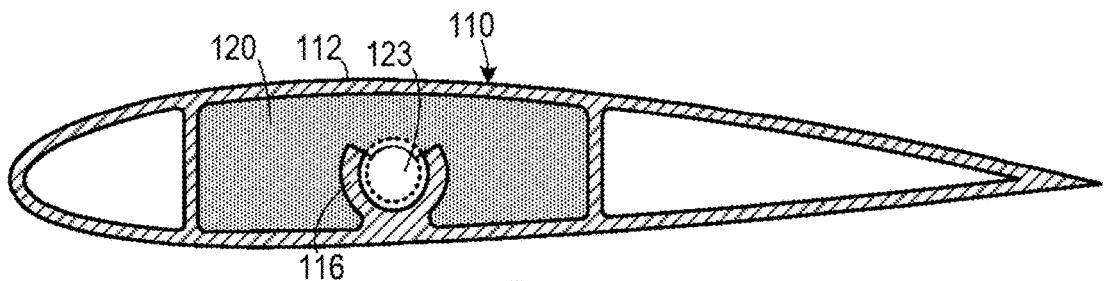
FIG. 1D is a cross sectional view of the system shown in FIG. 1A taken along line 1D-1D.
Figure 2:
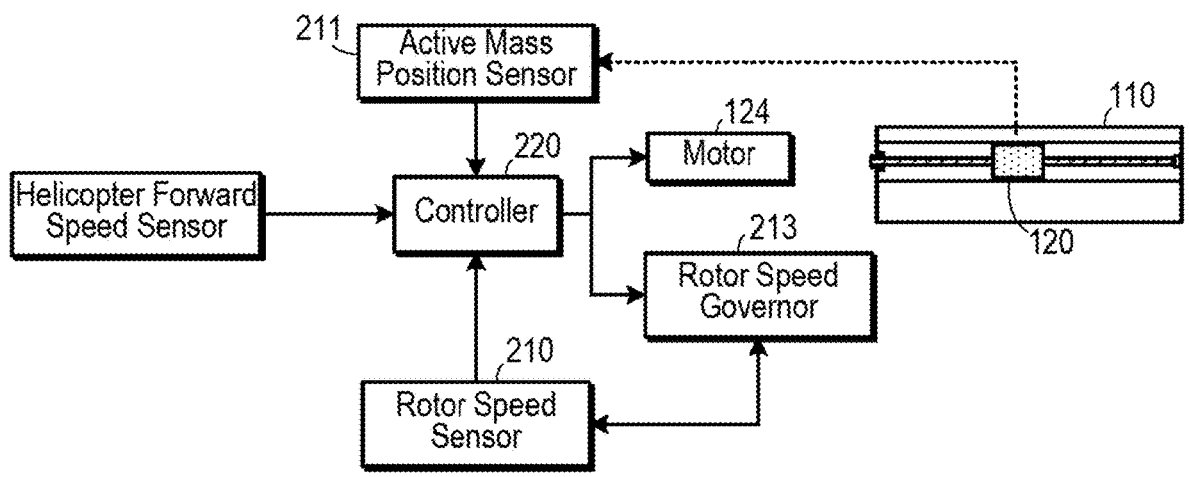
FIG. 2 is a block diagram of a helicopter blade employing an anti-resonance system.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The present blade design includes a moving mass system to actively move the resonance points of the blade. The sliding mass is located inside the blade and can travel along the length of the blade. The mass moves on a rail, which runs along the length and deforms with the blade. The mass is moved to a desired location using a mechanical control system. By changing the location of the mass along the length, the mass moment of inertia of the blade about the vertical axis is altered. Changing the mass moment of inertia of the blade changes the natural frequency of the blade. Varying the natural frequency, in turn, changes the resonance crossings. Hence, the system can actively change the location of its resonance points of the blade. The mass and location of the moving mass are selected and controlled to move the resonance points out of the rotor operating range.

As shown in FIGS. 1A-1D and 2, one example of an anti-resonance system 100 for variable speed rotors includes a blade 110 that defines an elongated channel 114 therein that runs the length of the blade 110. A blade tip 119 encloses the channel 114 and provides structural support to the distal end of the blade 110. A moveable mass 120 is disposed in the channel 114 and slides along its length. A moving device is coupled to the moveable mass 120 and moves it to a desired position within the channel 114. A controller 220 causes the moving device to move the moveable mass 120 to a position that avoids the resonance vibrations of the blade 110 during a rotor speed change. Changing the position of the moveable mass changes the natural frequency of the blade 110 so that resonance points are moved actively out of rotor operating speed, which reduces blade vibrations.

The moving device can include an elongated force application structure that applies force to the moveable mass 120 and an actuator, which can be an electric motor 124, that is responsive to the controller 220. The motor 124 manipulates the elongated force application structure so as to cause the elongated force application structure to move the moveable mass 120 to the selected position. In one embodiment, the elongated force application structure comprises a threaded rod 122. The motor 124 is coupled to a first end of the threaded rod 122, which is supported by a cradle 116 that runs substantially along the length of the blade 110. The opposite end of the threaded rod 122 is supported by a bearing 118, which may be supported by the blade tip 119. The moveable mass 120 defines a threaded passage 123 that is complimentary in shape to the threaded rod 122, which is disposed in the threaded passage 123, so that rotation of the threaded rod 122 causes lateral movement of the moveable mass 120.

In this embodiment, a rotational speed sensor 210 provides a rotational speed input to the controller 220, which determines a position of the moveable mass 120 that will result in the resonance points of the blade 110 being moved out of the rotor operating range, thereby reducing vibrations in the blade 110. This can be done using a database of fan plots stored in the controller 220. The motor 124 is responsive to a signal from the controller 220 and an active mass position sensor 211, which provides feedback regarding the position of the moveable mass 120. As a result, the motor 124 rotates the threaded rod 122 until the moveable mass 120 is in the desired selected position. The moveable mass 120 moves along the cradle 116, which runs along the length of the blade 110 and deforms with the blade 110.

As a result of the movement of the moveable mass 120, the mass moment of inertia of the blade about the vertical axis can be altered. Changing the mass moment of inertia of the blade 110 changes the natural frequency of the blade 110. Varying the natural frequency, in turn, changes the resonance crossings. Hence, the blade 110 can actively change the location of its resonance points. If the mass and location of the moving mass 120 are correctly selected, it is possible to move the resonance point out of the rotor operating range. The rotor speed is monitored by the speed sensor 210 and maintained by a speed governor 213, which are common devices in most helicopters. The signal from the speed governor 213 and speed sensor 210 can be fed into the controller 220 to control the location of the active mass 120.

Figure 3:
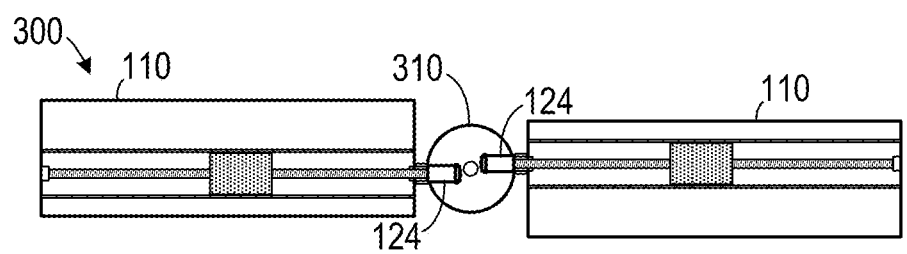
FIG. 3 is a schematic diagram showing a helicopter rotor assembly.

A helicopter rotor assembly 300 is shown in FIG. 3, in which a plurality of blades 110 are coupled to a main rotor hub 310, which is powered by the helicopter's engine. The motors 124 can be disposed in the main rotor hub 310, inside the blade or any of the structural components connecting the blade to the hub 310.

In one experimental embodiment, the cradle covers over 50% of the circumference of the threaded shaft so as to keep the shaft in place. The top of the threaded shaft is exposed to mate with the threads inside the moveable mass. Nylon glide inserts are placed on the inside of the blade cross section to reduce friction and to prevent the moveable mass from excessive vibration. The end of the threaded shaft opposite the drive motor is held into place by a bearing which is placed inside a bearing socket machined into the blade tip.

The following discloses details of one experimental embodiment of a method according to the invention as applied to helicopter rotor blades for a variable speed hinge-less rotor system.

Figure 4A:
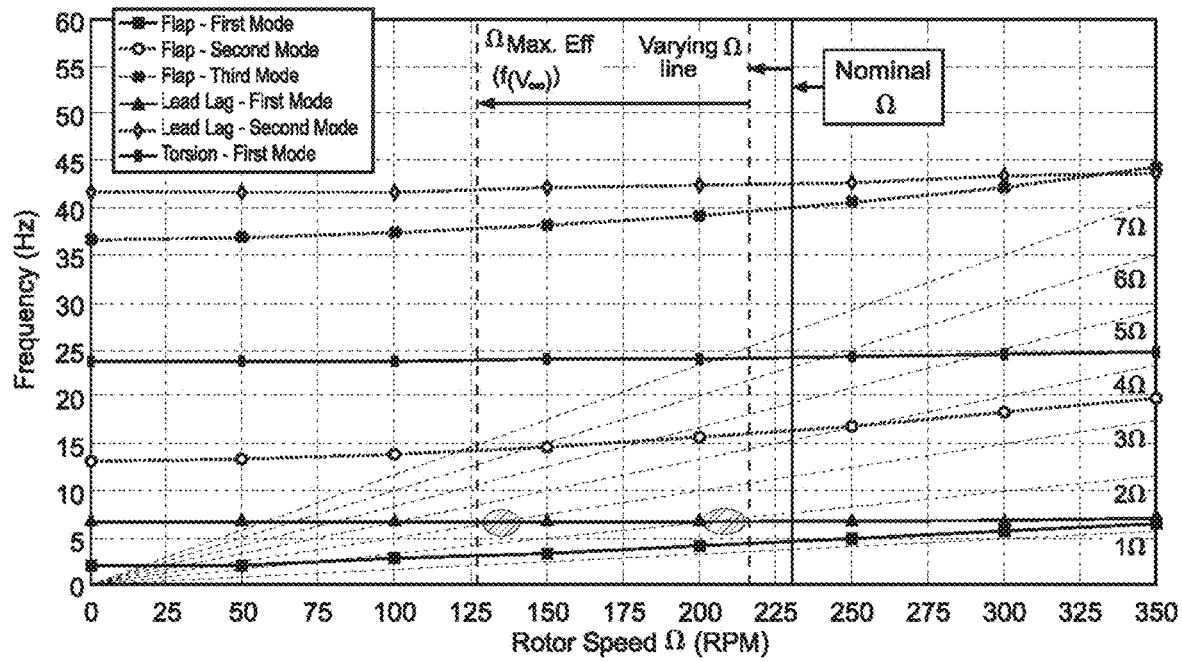
FIG. 4A is a graph showing a Fan plot for a typical hinge-less rotor blade with critical resonance points being shown.

The first step is to construct a Fan plot of the rotor system, as shown in FIG. 4A, either from computer models or from experimentation. Those of skill in the art are well aware of the procedure used to construct such a Fan plot. In the example shown, a computer model was built in DYMORE analysis software. The next step is to decide on the rotor speed ($\Omega$) nominal value, which is usually chosen based on the helicopter requirements and tip speed limitations. Next, the efficient rotor speed needs to be determined, which is a function of the helicopter forward speed ($V_\infty$). The procedure for this is described below. Efficient rotor speeds are usually below the nominal rotor speed due to the drag trend (induced and profile) of the rotor blade. As seen in FIG. 4A, there are several resonance points that cross the multiples of rotor operating frequency (also called the excitation frequency). Based on the analysis carried out in the experimental embodiment, the critical resonance points were found to be the First Lead-Lag frequency (indicated by triangles) crossing the $2*\Omega$ frequency and the $3*\Omega$ frequency lines, that are highlighted in the figure. $\Omega_{Resonance1}$ is the rotor speed at which the First Lead-Lag frequency crosses the $2\Omega$ line. $\Omega_{Resonance2}$ is the rotor speed at which the First Lead-Lag frequency crosses the $3\Omega$ line.

The next step is to decide on the sizing of the active moving mass. The active mass should be at least 25% of the total weight of the blade to move both the resonance points at least 18% from their initial location in the Fan plot. The initial location of the active mass determines how much the rotor speed is allowed to change. The movement of the mass should be smooth to mitigate any impulse forces or moments in the rotor system. The function below was found to facilitate a smooth change in the rotor speed, $$\Omega(t) = \Omega_1 + (\Omega_2 - \Omega_1) * \left(1 - \cos^2\left(\frac{\pi}{2} * \frac{t - t_1}{t_2 - t_1}\right)\right) \quad \text{Eqn 1}$$

$$t_1 \leq t \leq t_2$$

where t is time. Subscripts 1 and 2 corresponds to the initial and final values at time $t_1$ and $t_2$ respectively. The active mass should also be moved smoothly as given by the following function, $$x(\Omega) = x_1 + (x_2 - x_1) * \left(\frac{\Omega(t) - \Omega_1}{\Omega_2 - \Omega_1}\right). \quad \text{Eqn 2}$$

where x is the position of the active mass along the span of the blade. $\Omega_1 \leq \Omega(t) \leq \Omega_2$ as given in Eqn 1.

Efficient Rotor Speed: The most efficient rotor speed can be evaluated for a given rotor system in a comprehensive helicopter rotor analysis software like DYMORE or CAMRAD. DYMORE was used for this analysis. The procedure is as follows:

1. Maintain a constant forward speed of the helicopter ($V_\infty$)
   a. Run the rotor system at different rotational speeds and specify the trim conditions needed from the rotor. Trim conditions are usually specified as the amount of thrust the rotor needs to produce, the roll and pitch moment limits on the hub, flapping angles and so on.
   b. Once the rotor is trimmed, note down the power required.
   c. At a certain rotor speed, the rotor will no longer be able to trim and provide the desired thrust. This is the stall point of the rotor. This rotor speed and any lower rotor speed should be avoided.
   d. Now, compare all the power values computed at different rotational speeds and find the minimum power. The $\Omega$ corresponding to the minimum power is the most efficient rotor speed: $\Omega_{Max.\ Eff}$.
2. Repeat step 1. for different forward speeds and create a database.

Figure 4B:
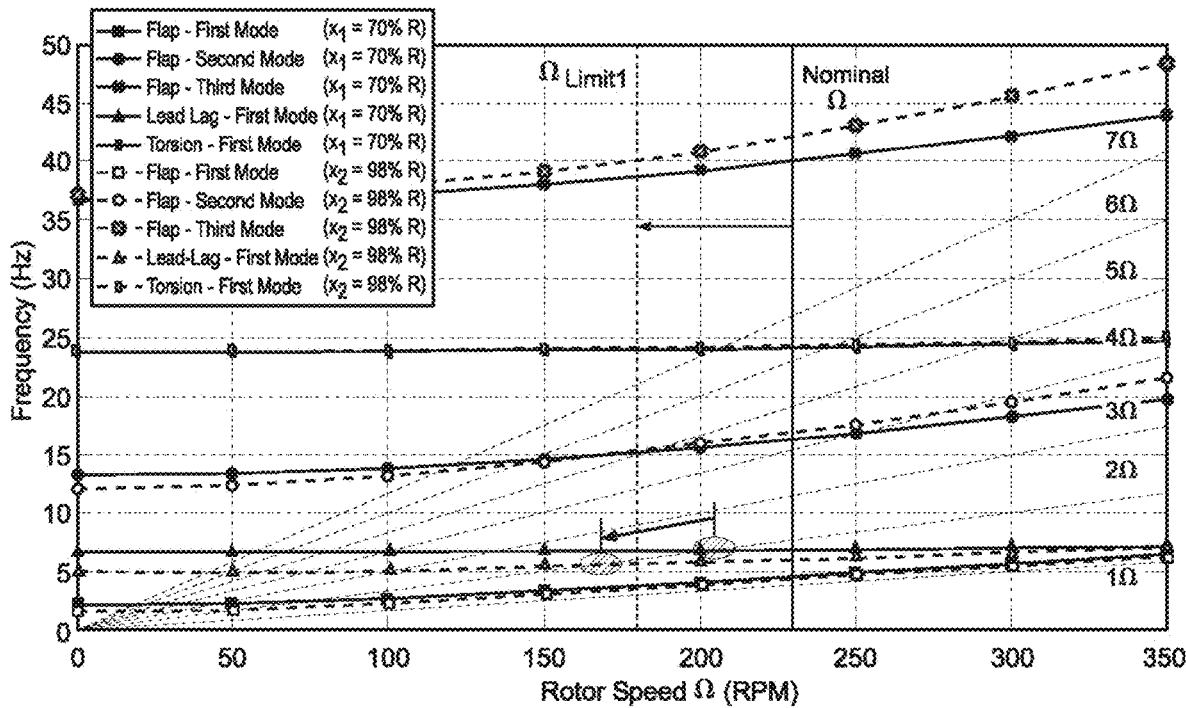
FIG. 4B is a graph showing initial position 70% R→Final Position 98% R.

Active Mass positions; Defining R as the total length of the rotor blade; the initial spanwise location of the active mass at $x_1=70\%$ R: In order to keep resonance point away from the rotor operating speed, the active mass is moved towards the blade tip to $x_2=98\%$ R in a manner given by Eqn 2 as the rotor speed is being reduced. The behavior of the blade frequencies and resonance points movement are shown in FIG. 4B. The resonance point always stays behind the rotor operating line when Eqn 1 and 2 is followed simultaneously.

For certain $V_\infty$ conditions, $\Omega_{Max.\ Eff}$ will be $\leq$New $\Omega_{Resonance1}$ resulting from moving active mass to 98% R. In such cases a limit needs to be imposed on $\Omega_2$ to prevent rotor from going through resonance, so $\Omega_2=\Omega_{Limit1}$, where $\Omega_{Limit1} \geq 1.05*$New $\Omega_{Resonance1}$. A 5% margin is found to be sufficient to avoid vibration issues. During reversion of the rotor speed, the mass can be moved to its original position in a similar manner using Eqn 2.

Figure 4C:
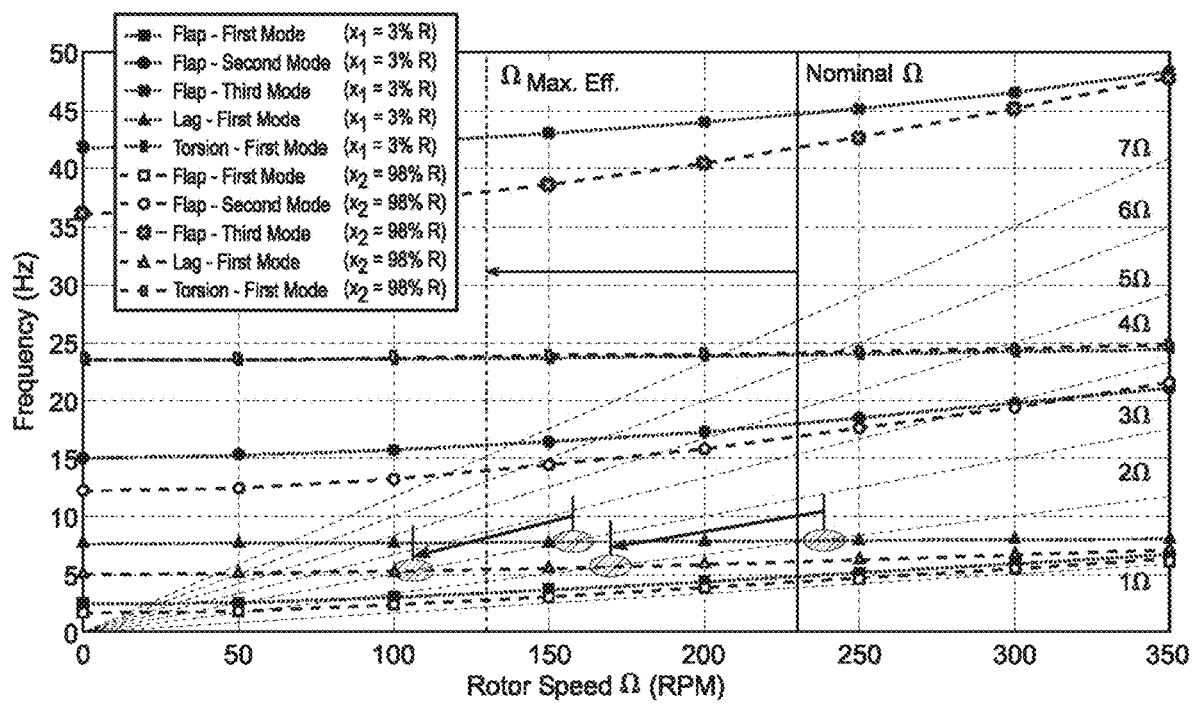
FIG. 4C is a graph showing initial position 3% R→Final Position 98% R.

Initial spanwise location of the active mass at 3% R: The resonance point will be above $1.12*\Omega_{Resonance1}$, as shown in FIG. 4C. In order to keep both the resonance points away from the rotor operating speed, the active mass is moved towards the blade tip to $x_2=98\%$ R using Eqn 2. The rotor will avoid both the resonance points as the rotor speeds always stays in-between when Eqn 1 and 2 is followed simultaneously. The time of transition, t, between rotor speeds can be as slow as needed since the rotor doesn't go through a resonance point due to the active mass system. Quick transitions would need a transmission system capable of handling high torque changes, so it is recommend to use t>=10 seconds in embodiments similar to this experimental embodiment.

It is also recommended to change the initial position of the active mass from $x_1=70\%$ R to $x_1=3\%$ R before rotor startup, to avoid the rotor going through resonance points in flight. At $x_1=3\%$ R position, increasing the rotor speed beyond the nominal value could lead to the rotor passing through a resonance point. Hence, it is a restriction if higher than nominal rotor speed is needed, but it offers a greater range of rotor speed reduction without resonance issues.

Figure 5:
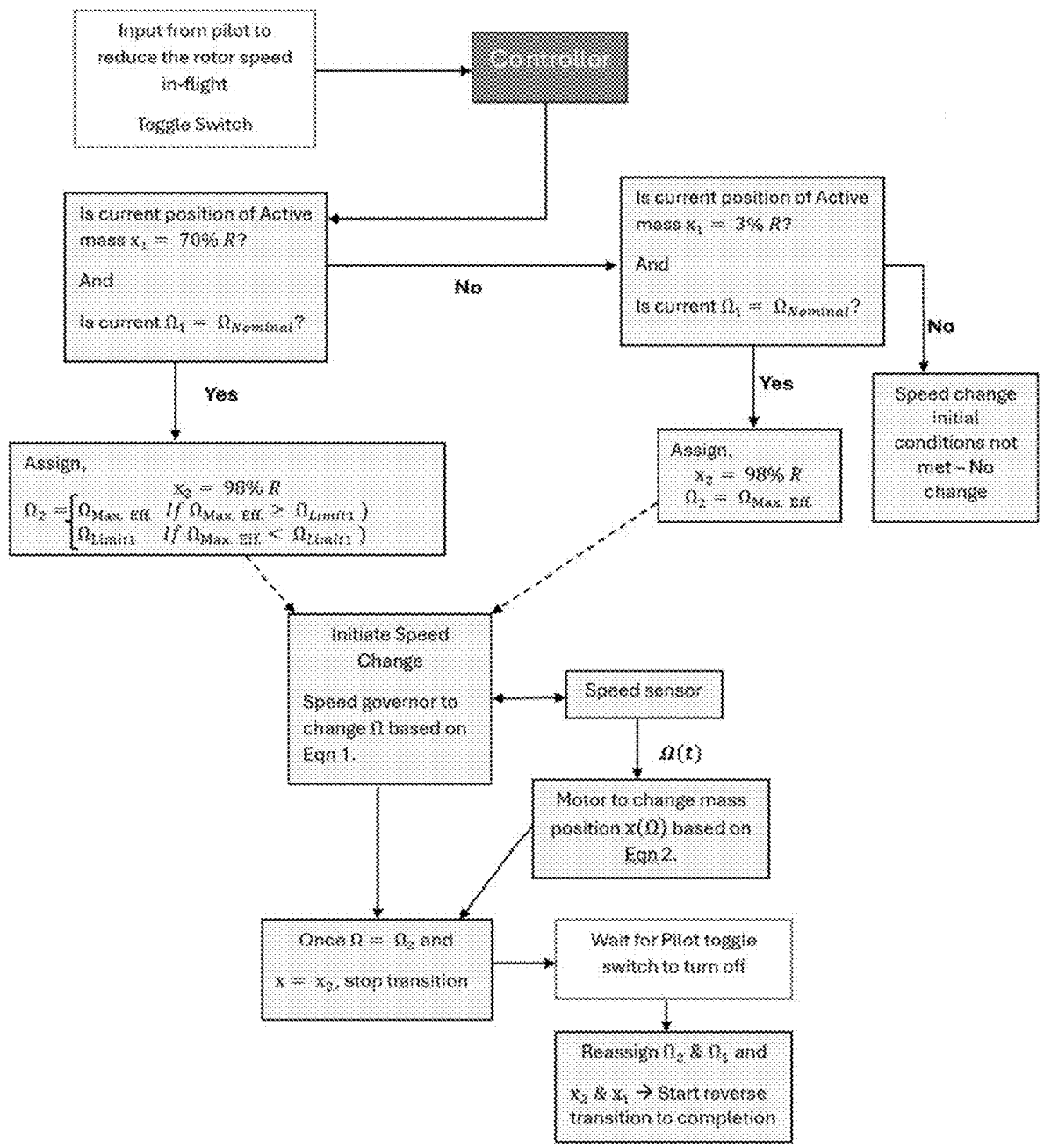
FIG. 5 is a flow chart that sets forth the control system algorithm.

The control algorithm employed in the experimental embodiment is shown in FIG. 5.

Figure 6A:
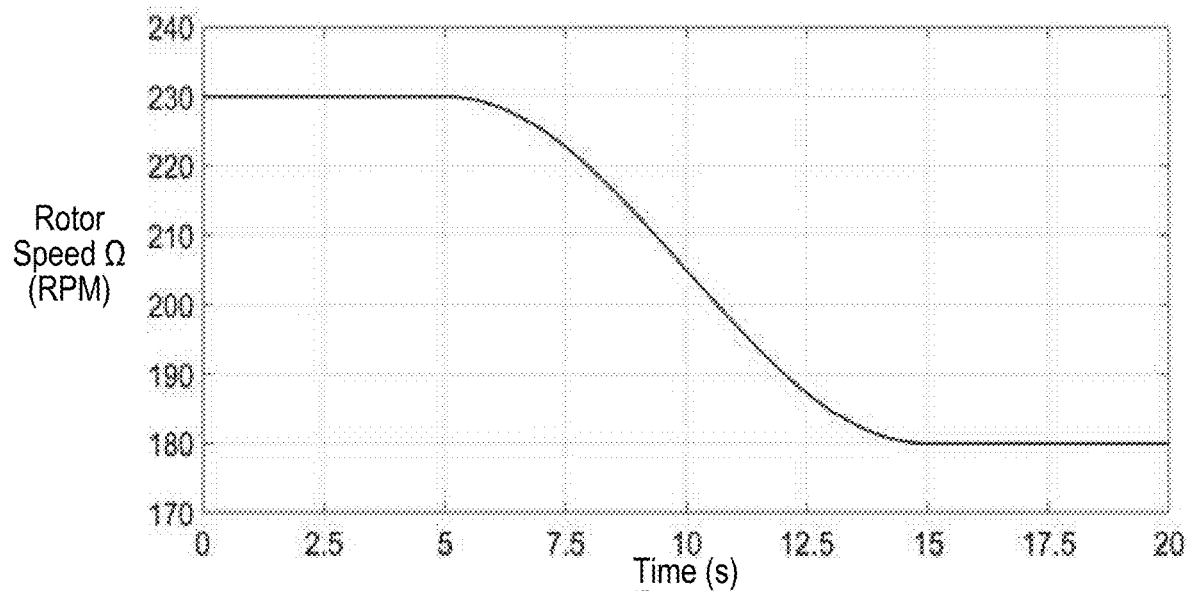
FIG. 6A is a graph showing rotor speed as it is changed smoothly.
Figure 6B:
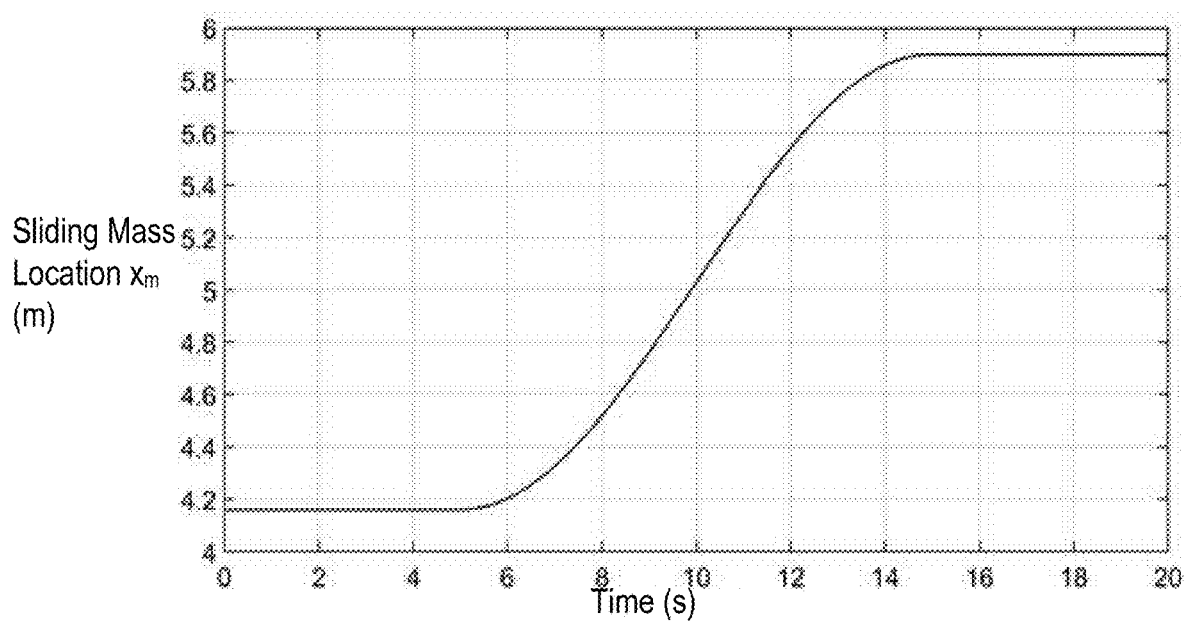
FIG. 6B is a graph showing the moveable mass as it is moved towards the tip of the blade smoothly.
Figure 6C:
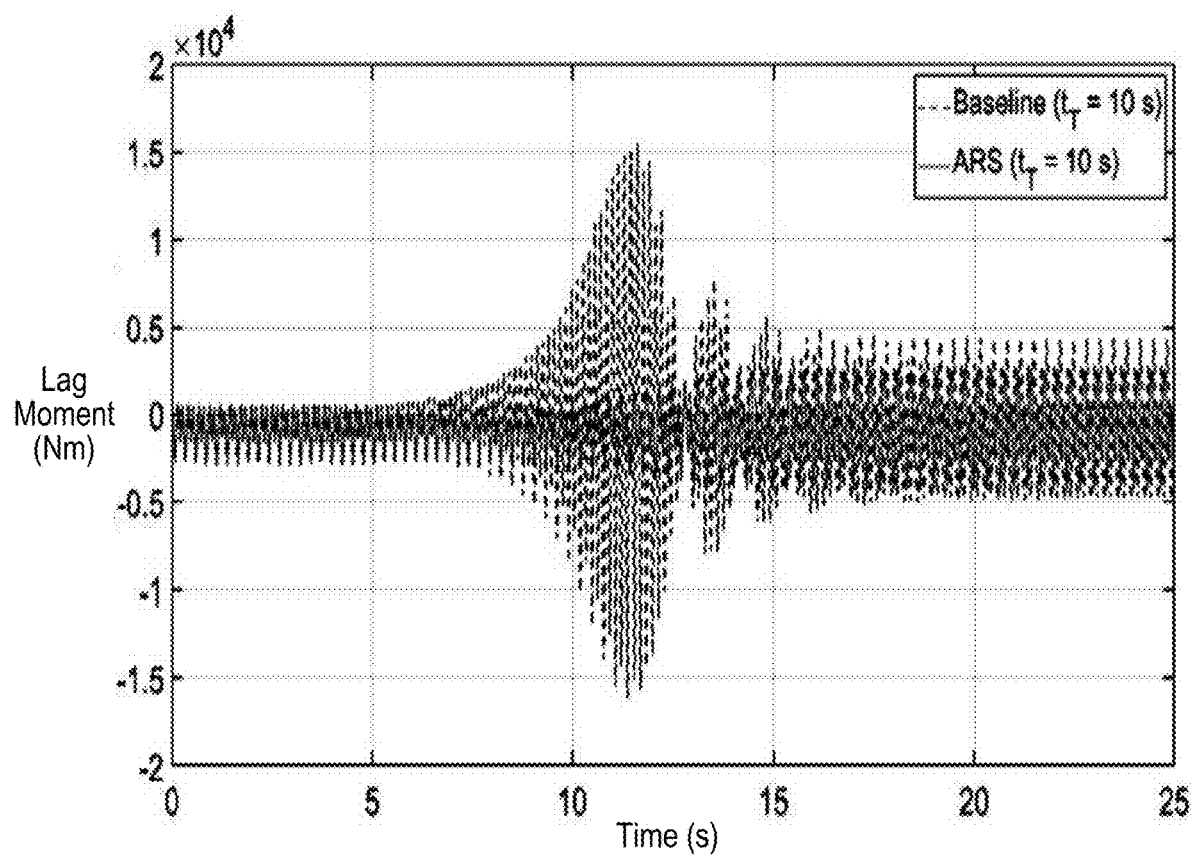
FIG. 6C is a graph showing the resonance vibrations bump as it disappears.

As shown in FIGS. 6A-6C, in this experimental embodiment, the moving mass was modeled as a point mass in DYMORE and the sliding motion was defined using the prismatic joint definition. The stiffness of the rail was assumed to be small compared to the blade and hence, neglected. The mass was assumed to be located on the beam's reference line. As the rotor speed was changed from 230 to 180 RPM in 10 seconds, the sliding mass was moved from 4.16 m to 5.90 m. As the mass was moved towards the tip, the natural frequency decreased. Therefore, the 2/rev lag resonance point located inside the rotor operating range was moved out of range. It was observed that the blade had no significant amplitude increase during this transition due to the absence of 2/rev resonance point and the amplitude of vibrations was decreased by almost 83% from the baseline blade without anti-resonance system.

The cradle design is critical because existing systems that employ a threaded rod alone may work for short and stiff rotating blades, such as propellers, but this can be problematic for long and flexible helicopter blades. As the unbraced length of the threaded rod increases, the bending stiffness decreases to the point that significant problems are introduced into the system.

Such existing systems use a moveable mass with a single threaded hole in the middle. Since the mass is free to move along the longitudinal axis of the blade, the entire volume from the lowest position of the mass to the highest position of the mass must be completely empty, leaving the threaded rod unbraced (unsupported). Any unbraced portion of the threaded rod will oscillate vertically because the difference in the stiffnesses of the threaded rod and the rotor blade are not insignificant. This is particularly problematic for rotary wing aircraft since the rotor blades have oscillating vertical deflections in forward flight, which occur with every revolution. Unbraced lengths of threaded rod would introduce additional vibratory problems, possibly even impacting the inside surfaces of the blade.

In an H-60 helicopter, the tips of the blades (length≈6000 mm, thickness≈50 mm) at rest are deflected approximately 10% of the rotor blade radius (approximately 600 mm). For comparison, the size of a threaded rod with similar stiffness properties would have to be ⌀40 mm:

| Young's Modulus | E | 200,000 | MPa |
|---|---|---|---|
| Length | L | 6000 | mm |
| Diameter | D | 40 | mm |
| Area | $A_x = p(D/2)^2$ | 1,257 | mm$^2$ |
| Moment of inertia | $I_{xx}$ | 125,664 | mm$^4$ |
| Beam Load | $w = A_x\ g$ | 0.097 | N/mm |
| Moment | $M = (1/2)\ w\ L^2$ | 1,741,075 | N − mm |
| Deflection | $D = (w\ L^4)/(8\ E\ I_{xx})$ | 623 | mm |

It is not practical to use a threaded rod that is 0.80 times the thickness of the rotor blade since this would render the mechanism nonfunctional as well as add excessive weight to the blade with no benefit. For the threaded rod to perform its function properly, it must be less than 0.30 times the thickness of the rotor blade. At this ratio, there is still room for the top and bottom surfaces of the airfoil, the cradle at the bottom, and the moveable mass in between.

Figure 7:
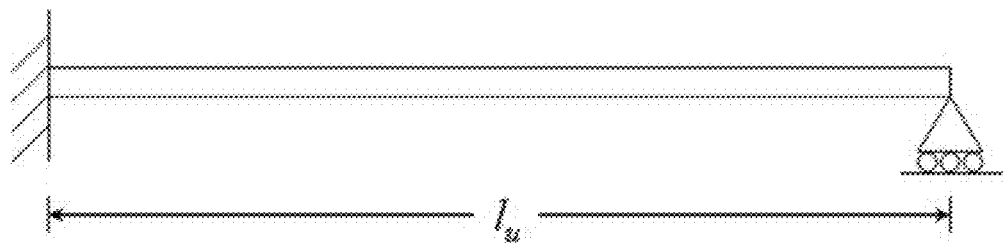
FIG. 7 is a schematic diagram of an idealized beam model for a threaded rod.
Figure 8A:
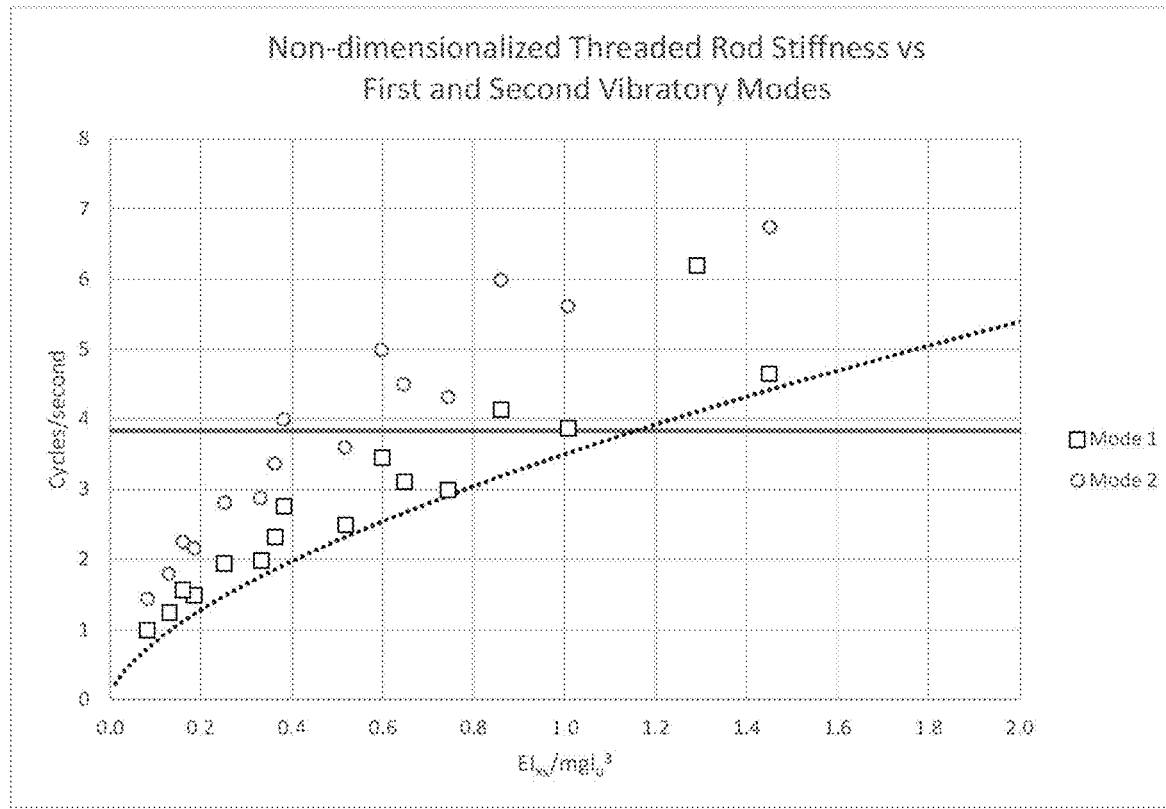
FIG. 8A is a chart showing non-dimensional threaded rod stiffness versus first and second vibratory modes.

Eigenvalue analyses of various configurations were performed to determine the correlation between the unbraced length of the threaded rod and the first two natural vibratory modes. The idealized beam model for the threaded rod is shown in FIG. 7. The threaded rod has a uniform mass per unit length m and a total weight of $ml_u g$, where g is the acceleration due to gravity. The clamped boundary condition shown on the left represents the fixity provided by the threaded rod inside the moveable mass. The pinned boundary condition on the right represents the end of the threaded rod in the bearing. The total unbraced length is shown in FIG. 4C as $l_u$. The results of the analyses are shown in FIG. 8A.

The solid horizontal line represents the upper bound for the rotational speed of the rotor blade (equivalent to 230 RPM). The square points represent the first mode of vibration and the round points represent the second mode of vibration. The dotted trend line represents the lower bound of the results obtained from the analyses. As the horizontal axis is the non-dimensionalized stiffness, the figure shows that in order to avoid any resonant frequencies up to 230 RPM, $EI_{xx}/mgl_u^3$ must be greater than approximately 1.2, which limits the threaded rods that can function while being unsupported along the length of the blade.

Figure 8B:
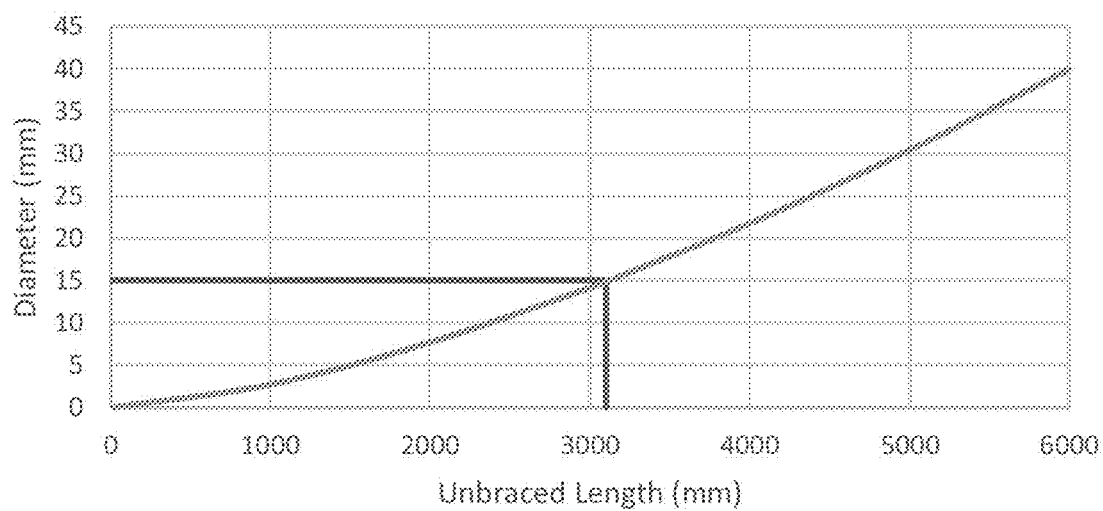
FIG. 8B is a chart showing minimum diameter of a threaded rod versus an unbraced length for a 50 mm thick rotor blade.

Based on the requirement that $EI_{xx}/mgl_u^3$ must be greater than 1.2, the curved line in the chart in FIG. 8B shows the minimum diameter of the threaded rod for unbraced lengths up to 6,000 mm. For a blade of 50 mm thickness, the threaded rod diameter cannot exceed 15 mm, which means that the unbraced length of the threaded rod cannot be greater than 3,100 mm without encountering resonant modes during flight. Again, using the H-60 as an example, using a Ø15 mm threaded rod would limit the movement of the mass along the blade to within a space of +/−100 mm from the midpoint of the blade.

For this reason, the cradle design is critical to this invention and why it is shown to be part of the extruded blade section. The cradle forces the threaded rod to deflect with the blade at all times. During any vertical oscillation, the center of mass of the threaded rod remains the same with respect to the blade such that the moment of inertia remains constant and no independent and/or resonant vibrations occur in the threaded rod.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An anti-resonance system for a blade defining an elongated channel therein and affixed to a helicopter rotor, the elongated channel having a length, the anti-resonance system comprising:
   (a) an elongated cradle that runs along the length of the elongated channel;
   (b) an elongated threaded rod disposed within the elongated channel and supported by the elongated cradle;
   (c) a moveable mass disposed around both the elongated cradle and the elongated threaded rod within the elongated channel, the moveable mass including a threaded portion that is engaged with the elongated threaded rod so that rotation of the threaded rod causes lateral movement of the moveable mass; and
   (d) a controller configured to cause the moving device to move the moveable mass to a selected position within the elongated channel so as to avoid the resonance vibrations of the blade during a rotor speed change;
   (e) an actuator that is responsive to the controller and that rotates the elongated threaded rod to move the moveable mass to the selected position,
   wherein changing a position of the moveable mass changes the blade natural frequency so as to move resonance points actively out of rotor operating speed, thereby reducing blade vibrations.

2. The anti-resonance system of claim 1, wherein the elongated threaded rod has a circumference and wherein the cradle covers at least 50% of the circumference of the elongated threaded rod.

3. The anti-resonance system of claim 1, wherein the threaded rod has a first end and an opposite second end and further comprising a bearing that supports the threaded rod at the second end.

4. The anti-resonance system of claim 3, wherein the actuator is coupled to the first end of the threaded rod.

5. The anti-resonance system of claim 3, wherein the actuator comprises an electric motor.

6. A helicopter rotor assembly, comprising:
   (a) a main rotor hub;
   (b) a plurality of blades extending from the main rotor hub, each of the plurality of blades defining an elongated channel therein, wherein each of the plurality of blades includes:
      (i) an elongated cradle that runs along the length of the elongated channel;
      (ii) an elongated threaded rod disposed within the elongated channel and supported by the elongated cradle;
      (iii) a moveable mass disposed around both the elongated cradle and the elongated threaded rod within the elongated channel, the moveable mass including a threaded portion that is engaged with the elongated threaded rod so that rotation of the threaded rod causes lateral movement of the moveable mass; and (iv) an actuator that rotates the elongated threaded rod to move the moveable mass to the selected position; and (c) a controller configured to cause each actuator to move the moveable mass in the blade corresponding to the actuator to a selected position within the elongated channel so as to avoid resonance vibrations of the blade during a rotor speed change;

wherein changing a position of the moveable mass changes the blade natural frequency so as to move resonance points actively out of rotor operating speed, thereby reducing blade vibrations.

7. The helicopter rotor assembly of claim 6, wherein the elongated threaded rod has a circumference and wherein the cradle covers at least 50% of the circumference of the elongated threaded rod.

8. The helicopter rotor assembly of claim 6, wherein the threaded rod has a first end and an opposite second end and further comprising a bearing that supports the threaded rod at the second end.

9. The helicopter rotor assembly of claim 8, wherein the actuator is coupled to the first end of the threaded rod.

10. The helicopter rotor assembly of claim 7, wherein the actuator comprises an electric motor.

\* \* \* \* \*